INVENTORS
FRANK C. HASSE
LLOYD W. YOUNG
BY
ATTORNEY

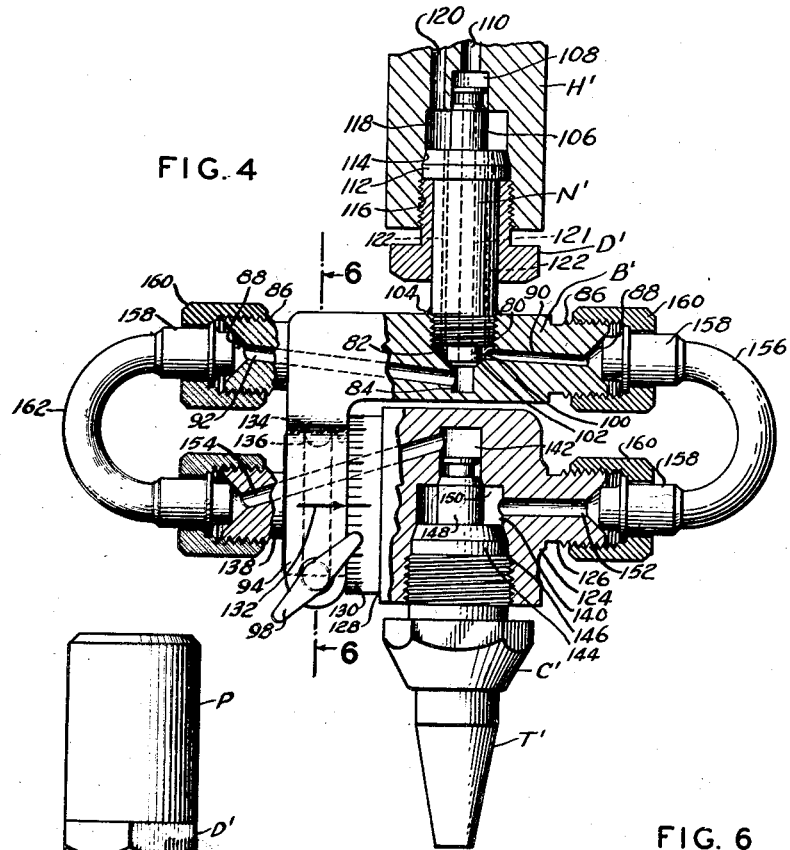

Patented June 18, 1940

2,204,756

UNITED STATES PATENT OFFICE 2,204,756

BLOWPIPE

Frank C. Hasse, La Grange, Ill., and Lloyd W. Young, Scotch Plains, N. J., assignors to Oxweld Acetylene Company, a corporation of West Virginia Application April 5, 1938, Serial No. 200,152

17 Claims. (Cl. 158—27.4)

This invention relates to the art of metal cutting and more particularly to means for adapting a straight blowpipe mounted on a cutting machine to the cutting of bevelled plate edges.

The blowpipe of a cutting machine is usually of the straight type, in which the handle, stem, head and tip are in axial alignment, and is usually mounted in a vertical position so as to deliver the cutting jet perpendicularly against a horizontal surface. This method of mounting is satisfactory when the machine is used to make vertical cuts.

However, when it is desired to cut a plate edge at an angle to the vertical, it is necessary to adjust the entire blowpipe to the desired angle of cut, and, when the operation is finished, to readjust the blowpipe to a true vertical position. Moreover, some cutting machines, particularly the smaller models, are so compactly arranged that adjustment of the entire blowpipe is practically impossible, or at the least the amount of possible adjustment is very limited. A means for permitting rapid adaptation of such a cutting blowpipe to the bevelling of plate edges has long been desired.

Furthermore, it is desirable to provide an accurate indicating means for insuring that the finished cut shall be at the desired angle to the vertical, particularly as the included angle of the V-groove customarily used in welding has, in certain methods of welding, a critical value with respect to the quality of the welded joint and to the speed and economy of the welding operation.

Prior attempts to achieve these results have been directed to a redesign of the entire blowpipe. The results of these attempts have been generally unsatisfactory due to the complicated designs and constructions, the lack of accurate positioning means, and the fact that the entire blowpipe cannot be maintained in a true vertical plane.

It is therefore among the objects of this invention to provide an adjustable unit or adaptor which will permit a cutting machine blowpipe to be used for the bevelling of plate edges; which can be mounted on the blowpipe head and replaces the blowpipe nozzle or tip; which includes a mounting means for the displaced blowpipe nozzle or tip; which can be accurately adjusted throughout a wide range to form a cut at any desired angle; which includes means for retaining the adjustable parts in adjusted relation; which delivers preheating gas and cutting gas to the blowpipe tip irrespective of the angular relation of its parts; and which is compact in design, economical to manufacture and sturdily constructed.

These and other objects of the invention will in part be obvious and in part become apparent from the following description and the accompanying drawings, in which:

Fig. 4 is a sectional view illustrating another form of adaptor embodying the invention;

Fig. 5 is an end view of the adaptor shown in Fig. 4; and

Fig. 6 is a sectional view taken on the line 6—6 of Fig. 4, looking in the direction of the arrows.

In general, the invention is directed to a bevelling adaptor unit designed to be interposed between and operatively to connect a cutting blowpipe head and a cutting blowpipe nozzle or tip which latter is normally detachably secured to the blowpipe head. The unit may comprise a first member, such as a body formed with seats adapted to engage the usual seating surfaces in the blowpipe head, and a second member adjustably connected to the first member. The second member may be a head formed with seating surfaces adapted to be operatively engaged by the seats on the nozzle or tip. The adaptor body may be operatively secured to the blowpipe head interchangeably with the nozzle or tip, and the adaptor head is so designed that the nozzle or tip may be operatively secured interchangeably thereto or to the blowpipe head. Suitable passages are provided in the adaptor body and the adaptor head so that a preheating gas, such as a mixture of oxygen and acetylene, and a cutting gas, such as oxygen, may be separately conducted through the adaptor unit from the blowpipe head to the cutting tip or nozzle, irrespective of the angular relation of the axis of the tip or nozzle to the axis of the blowpipe. Furthermore, suitable indicating means are provided on the relatively adjustable parts of the adaptor so that the desired angle of cutting may be accurately predetermined.

Figure 1:
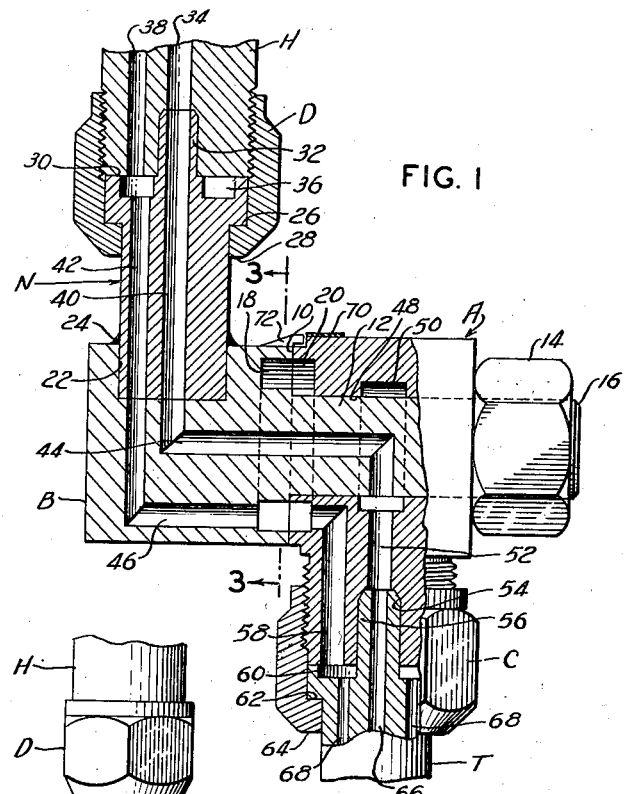
Fig. 1 is a side view, partly in section, of one form of adaptor embodying the invention.
Figure 2:
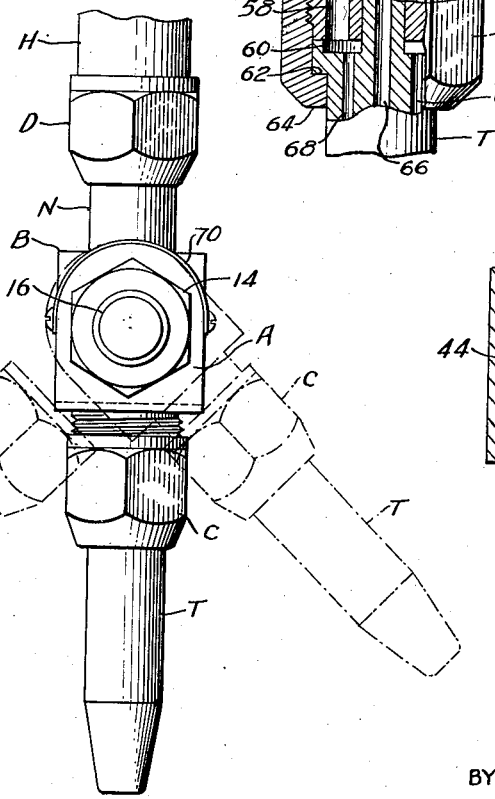
Fig. 2 is an end view of the adaptor shown in Fig. 1.
Figure 3:
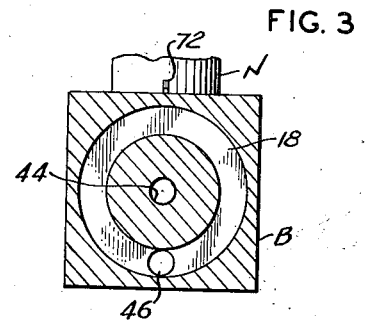
Fig. 3 is a sectional view taken on the line 3—3 of Fig. 1, looking in the direction of the arrows.

In the modification of the invention illustrated in Figs. 1, 2, and 3, the adaptor unit comprises a body B to which is adjustably connected a head A. Rigidly secured to the body B is one end of a nipple N, the opposite end of which is formed to provide a double seat similar to that on a cutting nozzle or tip. This end of the nipple may be secured in the nozzle receiving recess of the head H of a machine cutting blowpipe, preferably of the straight type, as by a clamping nut D similar to the usual nozzle clamping nut C which ordinarily is used to secure the tip or nozzle T to the blowpipe head H. When using the adaptor, however, the tip T is removed from the blowpipe head and is secured by the nut C to a portion of the adaptor head A which is shaped to correspond to the head H of the blowpipe.

One end of the body B is reduced to form a shoulder 10 and a trunnion 12 upon which the head A is pivotally mounted and secured in position by a nut 14 engaging the threaded end 16 of the trunnion. An annular groove 18 is cut in the shoulder 10 around the trunnion 12 and coincides with a similar groove 20 in the juxtaposed face of the adaptor head A.

Adjacent its opposite end, the body B is formed with a bore 22 in which the inner end of the nipple N is sealed as by solder 24. The outer end of nipple N is enlarged to form a shoulder 26 cooperatively engaged with a flange 28 on the nut D which may be threaded on the blowpipe head H. A seating face 30 on this end of the nipple engages the end of the blowpipe head and a central extension 32 on the face 30 enters the usual recess provided in the cutting gas passage 34 of the head H. Surrounding the extension 32 is an annular groove 36 cut in the seating face 30 and in communication with the preheat gas passage 38 in the blowpipe head. Drillings 40 and 42 extending longitudinally through nipple N form continuations of passages 34 and 38, respectively.

An angular passage 44, forming a continuation of drilling 40, extends centrally from the bore 22 through body B and terminates in the bearing surface of the trunnion 12. A second angular passage 46, forming a continuation of drilling 42 extends through body B and terminates in annular groove 18.

The surface 48 of the adaptor head A bearing on the trunnion, is centrally recessed to provide an internal annular channel 50 in continuous communication with the end of passage 44. A central cutting gas passage 52 extending longitudinally through the head A communicates at one end with the channel 50 and at its opposite end is enlarged to form a recess 54 receiving extension 56 on tip T. An angular passage 58 extends eccentrically through head A, opening at one end into groove 20 and communicating at the other end with an annular recess 60 in the seating face of blowpipe tip T. Tip T includes a shoulder 62 engageable by a flange 64 on clamping nut C which is threaded on head A to hold the tip T in operative association therewith. The tip T is provided with the usual cutting gas passage 66, forming a continuation of adaptor head passage 52, and with the customary preheat gas passages 68 opening at one end into recess 60.

To use the bevelling adaptor, the tip T is disengaged from the blowpipe head H and secured to the adaptor head A by clamping nut C. Nipple N on body B is then secured in the blowpipe head by clamping nut D. Nut 14 is loosened and head A is turned on trunnion 12 until a scale 70, adjustably secured to head A and cooperating with an arrow, line or pointer 72 on body B, indicates the correct angle of cut; after which nut 14 is tightened to hold head A in its adjusted position.

When the blowpipe valves are operated, preheat gas will pass from passage 38 in blowpipe head H, through drilling 42, passage 46, grooves 18 and 20, passage 58, recess 60 and preheat gas passages 68 in tip T. Similarly, cutting gas will pass from passage 34 through drilling 40, passage 44, channel 50, passage 52 and cutting gas passage 66 in tip T. The cooperating annular grooves 18 and 20, and channel 50 communicating with passage 44, permit gas to pass through the bevelling adaptor from blowpipe head H to tip T in all adjusted positions of adaptor head A.

An alternative form of bevelling adaptor shown in Figs. 4, 5, and 6, includes a body B' to which is adjustably secured a head A'. A nipple N' sealed to the body B' may be secured by a nut D' in the head H' of a machine cutting blowpipe from which the usual cutting tip or nozzle T' and nozzle clamping nut C' have been removed and secured to a suitably formed portion of the head A'.

The upper surface of body B' is bored to form a stepped recess 80 having a conically convergent bottom wall 82 and terminating in a smaller recess 84. Each end of the body B' is reduced in size to form a threaded boss 86 axially recessed as at 88. A drilling 90 extends through the body from the right hand recess 88, as viewed in Fig. 4, through the wall 82, and another drilling 92 extends from left hand recess 88 to the small recess 84. Adjacent its left end, body B' is formed with a pair of downwardly extending semi-circular arms 94 and 96, forming a bearing for head A', and a clamping screw 98 extends through and abuts arm 94 and is threaded into arm 96.

One end of the nipple N' has a tubular extension 100 and is threaded into recess 86 so that the end of the extension engages the wall 82 and prevents communication between recess 80 and recess 84. The tubular extension may be sealed to wall 82 by a blind silver soldered joint 102 and nipple N' is sealed to body B' by solder as at 104. At its opposite end, nipple N' has a reduced portion 106 extending into the usual recess 108 in the cutting gas passage 110 of the blowpipe head H'. At a short distance from this end, the nipple is formed with a collar 112 seating against a shoulder 114 in the recess 116 in the blowpipe head and this collar forms one wall of a chamber 118 communicating with the preheat gas passage 120 in the head. The clamping nut D' is threaded into the lower end of recess 116 and engages collar 112 to hold nipple N' in operative relation with the blowpipe head. A central drilling 121 connects recesses 84 and 108 and eccentric drillings 122 connect chamber 118 with recess 80.

The bevelling adaptor head A' comprises a main body portion 124, reduced at one side to form a threaded and recessed boss 126. Adjacent the opposite side of the body portion, the head A' is formed with a cylindrical shoulder 128 on which is adjustably secured a scale 130 calibrated in degrees and cooperatively associated with a pointer or arrow 132 on the arm 94 of the adaptor body B'. The head A' also includes a trunnion 134 mounted in the arms 94 and 96 and formed with a recess 136 cooperatively receiving the screw 98, and a second threaded and recessed boss 138.

The body portion 124 is bored to form a tip or nozzle receiving recess 140 similar to the recess 116 in blowpipe head H' and terminating in a small recess 142. A collar 144 on tip T' is held in engagement with a bevelled shoulder 146 in the recess 140 by means of the clamping nut C' which threadedly engages the lower end of the recess. Nipple 148 on tip T' sealingly engages small recess 142 and the collar 144 cooperates with recess 140 to form a chamber 150. The cutting gas passage in tip T' communicates with recess 142 and the preheat gas passages therein communicate with chamber 150.

Drillings 152 and 154 extend respectively through boss 126 to chamber 150 and through boss 138 to recess 142. A return bend conduit 156, having a conventional nipple 158 silver soldered to each end, is secured to the threaded bosses 86 and 126 at the right end of the adaptor as viewed in Fig. 4 by nipple nuts 160, and a similar conduit 162 connects threaded bosses 86 and 138 at the left end of the adaptor unit.

When the bevelling adaptor is not in use, a seat protector P is threaded onto nut D' to protect the seats of nipple N'. To assemble the adaptor to the blowpipe head H', nut C' is loosened and tip T' is removed from the blowpipe head and secured to the adaptor head A'. The head A' is maintained assembled to the body B' through engagement of the screw 98 in recess 136, and this screw must be removed before the bevelling adaptor can be dismantled.

After the tip T' has been removed from blowpipe head H', seat protector P is removed from nut D' and nipple N' is clamped in head H' by this nut. Screw 98 and the lower pair of nipple nuts 160 are then loosened and adaptor head A' accurately adjusted with respect to body B' by means of scale 130 and pointer 132 to the desired angle of cut. The screw 98 and the lower nipple nuts 160 are then tightened and the assembly is ready for use. The upper pair of nuts 160 are never loosened except to permit dismantling of the adaptor.

Cutting gas may now flow from passage 110 through recess 108, drilling 121, recess 84, drilling 92, tube 162, drilling 154 and recess 142 into the cutting gas passage of tip T'. Preheat gas flows from passage 120 through chamber 118, drillings 122, recess 80, drilling 90, tube 156, drilling 152 and chamber 150 into the preheat gas passages of tip T'. The respective cutting gas and preheat gas passages through the adaptor remain continuous irrespective of the relative position of head A' with respect to body B'.

It will be apparent that each of the above described constructions provides a compact bevelling adaptor unit which can be mounted quickly on a machine cutting blowpipe head and has provisions for mounting the displaced blowpipe nozzle or tip thereon to permit the angle of cut to be quickly and accurately varied.

Numerous changes may be made in the details of the adaptors disclosed, and certain features may be used apart from others, without departing from the principles of the invention or sacrificing the advantages thereof.

What is claimed is:

1. For use with a blowpipe including a head having seating surfaces and a nozzle normally detachably secured to said head and formed with seats engaging said seating surfaces; an adaptor unit designed to be interposed between and operatively to connect said head and said nozzle to permit the axis of said nozzle to be angularly adjusted with respect to the axis of said head, said unit comprising, in combination, a first member formed with seats adapted to engage said head seating surfaces whereby said first member may be operatively associated with said head interchangeably with said nozzle; and a second member adjustably connected to said first member and formed with seating surfaces adapted to be engaged by said nozzle seats whereby said nozzle may be operatively associated interchangeably with said head or with said second member, each of said members being drilled to form continuously communicating gas passages in continuation of the gas passages in said blowpipe head and blowpipe nozzle.

2. For use with a blowpipe including a head having seating surfaces, a nozzle formed with seats adapted to engage said seating surfaces and a clamping nut to retain said nozzle removably assembled to said head; an adaptor unit designed to be interposed between and operatively to connect said head and said nozzle to permit angular adjustment of said nozzle relative to said head and comprising, in combination, a first member formed with seats adapted to engage said head seating surfaces whereby said first member may be operatively associated with said head interchangeably with said nozzle; means to secure said first member to said head when said nozzle has been disconnected from the head; a second member formed with seating surfaces adapted to be engaged by said nozzle seats and a portion to operatively receive said nozzle clamping nut whereby said nozzle may be operatively secured interchangeably to said head and to said second member; and means adjustably securing said first member to said second member, said members being drilled to form continuously communicating gas passages therein in continuation of the gas passages in said head and standard nozzle.

3. An adaptor unit designed to be interposed between and operatively connect a blowpipe head and a blowpipe nozzle to permit the axis of said nozzle to be angularly adjusted with respect to the axis of said head, said unit comprising, in combination, a body; a nipple sealed to said body and formed with seats adapted to engage the seating surfaces of said blowpipe head whereby said nipple may be operatively secured to said head interchangeably with said nozzle; and a member adjustably secured to said body and formed with seating surfaces adapted to be engaged by the seats on said nozzle whereby said nozzle may be operatively secured to either said blowpipe head or said member, said body, nipple and member being drilled to form gas passages in continuous communication irrespective of the angular relation of said body and member and forming continuations of the gas passages in said head and nozzle.

4. An adaptor unit designed to be interposed between and operatively to connect a blowpipe head and a blowpipe nozzle to permit angular adjustment of said nozzle relative to said head, said unit comprising, in combination, a body; a nipple secured at one end in a recess in said body and seats formed on the opposite end of said nipple and adapted to engage the seating surfaces in said blowpipe head interchangeably with the seats formed on said nozzle; an annular shoulder adjacent said opposite end of said nipple; a threaded clamping nut having a surface rotatably engaging said nipple between said shoulder and said body; an adaptor head rotatably secured to said body; a recess formed in said adaptor head and having seating surfaces adapted to engage the seats on said nozzle interchangeably with the seating surfaces in said blowpipe head; gas passages extending through said nipple, said body and said adaptor head, the gas passages in said adaptor head terminating in said recess; and means for maintaining said gas passages in continuous communication irrespective of the relative angularity of said body and said adaptor head.

5. An adaptor unit as claimed in claim 4, in combination with means for retaining said body and head in adjusted relation.

6. An adaptor unit as claimed in claim 4, in combination with cooperating means on said body and said head for accurately indicating the relative angularity thereof.

7. An adaptor unit as claimed in claim 4, in which said clamping nut is adapted to threadedly engage a blowpipe head to secure said nipple therein.

8. An adaptor unit as claimed in claim 4, in which a portion of said head is threaded to receive a clamping nut whereby a blowpipe nozzle may be secured in said recess.

9. An adaptor unit as claimed in claim 4, in combination with means for retaining said body and said head in adjusted relation and cooperating means on said body and said head for accurately indicating the relative angularity thereof.

10. An adaptor unit comprising, in combination, a body adapted to be operatively secured in the nozzle receiving recess in the head of a blowpipe; a head adjustably secured to said body and formed to support a blowpipe nozzle adapted to be operatively secured interchangeably to either of said heads; and means for securing said adaptor head in any one of a plurality of adjusted positions with respect to said body, said adaptor unit having gas passages extending therethrough and adapted to communicate at each end with the gas passages in said blowpipe head and said nozzle respectively.

11. An adaptor unit comprising, in combination, a body adapted to be operatively secured in the nozzle receiving recess in the head of a blowpipe; a head adjustably secured to said body and adapted to support a blowpipe nozzle designed to be operatively secured interchangeably to either of said heads, said body and adaptor head each having a plurality of passages therethrough adapted to communicate respectively with the gas passages in said blowpipe head and said nozzle; and means comprising a plurality of return bend conduits continuously connecting each passage in said body with a corresponding passage in said adaptor head irrespective of the relative adjusted position of said adaptor head with respect to said body.

12. An adaptor unit designed to operatively and adjustably connect a cutting blowpipe head and a cutting blowpipe nozzle, said unit comprising, in combination, a body; a bore in one side of said body adjacent one end thereof; a reduced trunnion at the other end of said body; an annular recess in the shoulder formed by the junction of said reduced trunnion with said body; a nipple secured in said bore, the outer end of said nipple being adapted to be operatively secured in said blowpipe head interchangeably with said nozzle; cutting gas and preheat gas passages in said nipple; a cutting gas passage in said body communicating with said bore and with the cutting gas passage in said nipple; a preheat gas passage in said body connecting said bore and said recess and communicating with the preheat gas passage in said nipple; a head rotatably mounted at one end on said trunnion and having a face engaging said shoulder; an annular recess in said face registering with the recess in said shoulder; an inwardly facing circumferential channel in said head communicating with the cutting gas passage in said body; an axial recess in the opposite end of said head, said recess being adapted to operatively receive a cutting nozzle; a preheat gas passage extending from said annular head recess through said opposite end; and a cutting gas passage connecting said head channel and said axial recess.

13. An adaptor unit as claimed in claim 12, in combination with means for retaining said body and said head in adjusted angular relation and cooperating means on said body and said head for accurately indicating the angular relation thereof.

14. An adaptor unit comprising, in combination, a body; a central stepped bore in one side of said body; a threaded boss at each end of said body; a recess in each of said bosses; a nipple secured in said bore and separating the same into independent chambers; a cutting gas and at least one preheat gas passage extending longitudinally through said nipple, said cutting gas passage opening into one of said chambers and said preheat gas passage or passages opening into the other of said chambers; oppositely extending drillings in said body, each connecting one of said chambers with one of said recesses; a pair of arms on the opposite side of said body forming a split clamp bearing; a head having a shoulder engaging said arms and a trunnion mounted in said bearing; means retaining said trunnion in said bearing; a threaded boss on each end of said head; inner and outer axially aligned bores in said head; a drilling extending through each recess into one of said bores; and a pair of conduits connecting each boss on said body with a boss on said head.

15. An adaptor unit as claimed in claim 14, in combination with means mounted in said arms for retaining said body and said head in adjusted angular relation; and cooperating means on said body and said head for accurately indicating the angular relation thereof.

16. An adaptor unit as claimed in claim 14, in which said nipple has axially inner and outer seats adapted to engage the seating surfaces of a cutting blowpipe head, seating surfaces are formed in said outer bore and between said inner and outer bores and adapted to be cooperatively engaged by the seats on a cutting nozzle, said cutting gas passage extends through the outer seat on said nipple into said inner bore in the head and said preheat gas passage extends through the inner seat on said nipple into said outer bore in the head.

17. An adaptor unit comprising, in combination, a body; a bore in one side of said body adjacent one end thereof; a reduced trunnion at the other end of said body; an annular recess in the shoulder formed by the junction of said reduced trunnion with said body; a nipple secured in said bore; axially spaced seats on said nipple adapted to engage the seating surfaces of a cutting blowpipe head; cutting gas and preheat gas passages in said nipple; a cutting gas passage in said body communicating with said bore and with the cutting gas passage in said nipple; a preheat gas passage in said body connecting said bore and said recesses and communicating with preheat gas passages in said nipple; a head rotatably mounted at one end on said trunnion and having a face engaging said shoulder; an annular recess in said face registering with the recess in said shoulder; an inwardly facing circumferential channel in said head communicating with the cutting gas passage in said body; an axial recess in the opposite end of said head, said recess formed with axially spaced seating surfaces adapted to be cooperatively engaged by the seats on a cutting nozzle; a preheat gas passage extending from said annular head recess through said opposite end; and a cutting gas passage extending from said circumferential channel to said axial recess, said cutting gas passage and said preheat gas passage each connecting one of said nipple seats with one of said axial recess seating surfaces.

FRANK C. HASSE.
LLOYD W. YOUNG.